United States Patent [19]

Chen

[11] Patent Number: 4,929,362

[45] Date of Patent: May 29, 1990

[54] CALCIUM PHOSPHATE SCALE CONTROL METHODS

[75] Inventor: Fu Chen, Newtown, Pa.

[73] Assignee: Betz Laboratories, Inc., Trevose, Pa.

[21] Appl. No.: 346,103

[22] Filed: May 2, 1989

Related U.S. Application Data

[60] Division of Ser. No. 201,645, Jun. 1, 1988, abandoned, which is a continuation of Ser. No. 944,160, Dec. 18, 1986, abandoned, which is a continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^5$ .................................................. C02F 5/10
[52] U.S. Cl. ...................................... 210/701; 252/180
[58] Field of Search ............................... 210/698–701; 252/180, 181; 526/318.5, 332, 318.42

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,228,979 | 1/1966 | Gaertner | 260/512 R |
| 3,262,903 | 7/1966 | Robertson | 260/37 |
| 3,549,548 | 12/1970 | Newman | 252/181 |
| 3,706,717 | 12/1972 | Siegele | 210/701 |
| 3,799,893 | 3/1974 | Quinlan | 260/2 BP |
| 3,891,568 | 12/1975 | Nishio et al. | 422/15 |
| 3,989,636 | 11/1976 | Domba | 252/180 |
| 3,992,318 | 11/1976 | Gaupp et al. | 252/389 |
| 4,018,702 | 4/1977 | Boffardi | 252/389 |
| 4,029,577 | 6/1977 | Godlewski et al. | 210/701 |
| 4,046,707 | 9/1977 | Smith et al. | 252/180 |
| 4,095,029 | 6/1978 | Fields | 560/87 |
| 4,149,969 | 4/1979 | Robitaille et al. | 252/181 |
| 4,176,059 | 11/1979 | Suzuki | 210/698 |
| 4,207,405 | 6/1980 | Masler et al. | 525/328 |
| 4,209,398 | 6/1980 | Ii et al. | 252/180 |
| 4,288,327 | 9/1981 | Godlewski et al. | 210/698 |
| 4,303,568 | 12/1981 | May et al. | 422/13 |
| 4,324,684 | 4/1982 | Geiger et al. | 252/389 |
| 4,432,879 | 2/1984 | Greaves et al. | 210/699 |
| 4,457,847 | 7/1984 | Lorenc | 210/698 |
| 4,469,615 | 9/1984 | Tsuruoka et al. | 252/180 |
| 4,471,100 | 9/1984 | Tsubakimoto et al. | 525/367 |
| 4,490,308 | 12/1984 | Fong et al. | 260/513 |
| 4,500,693 | 2/1985 | Takehara et al. | 526/240 |
| 4,546,156 | 10/1985 | Fong et al. | 526/240 |
| 4,560,481 | 12/1985 | Hollander | 210/697 |
| 4,575,425 | 3/1986 | Boffardi et al. | 210/697 |
| 4,640,793 | 2/1987 | Persinski | 210/700 |
| 4,650,591 | 3/1987 | Boothe et al. | 210/700 |
| 4,659,480 | 4/1987 | Chen | 210/697 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,678,840 | 7/1987 | Fong et al. | 525/340 |
| 4,701,262 | 10/1987 | Chen | 210/699 |
| 4,708,815 | 11/1987 | Chen | 252/181 |
| 4,717,499 | 1/1988 | Chen | 252/181 |
| 4,732,698 | 3/1988 | Chen | 252/181 |
| 4,759,851 | 7/1988 | Chen | 210/697 |

FOREIGN PATENT DOCUMENTS

| | | |
|---|---|---|
| 0142929 | 5/1985 | European Pat. Off. |
| 2522637 | 12/1976 | Fed. Rep. of Germany . |
| 53-075138 | 7/1978 | Japan . |
| 56-155692 | 12/1981 | Japan . |
| 57-57706 | 4/1982 | Japan .................... 526/318.5 |
| 58-7415 | 1/1983 | Japan . |
| 58-9987 | 1/1983 | Japan . |
| 58-147412 | 9/1983 | Japan . |
| 58-154761 | 9/1983 | Japan . |
| 58-171576 | 10/1983 | Japan . |
| 1491701 | 11/1977 | United Kingdom . |

OTHER PUBLICATIONS

Chemical Abstract–78:16850y, 1973, 85:20537p, 1974, 98:203736r, 1983, 99:58708x, 1983.
Alcolac Technical Literature, 1976.
Corrosion, vol. 2, Shreir, 1976.
Hampshire Amino Acid Intermediates, W. R. Grace Co., 1975.

Primary Examiner—Peter Hruskoci
Attorney, Agent, or Firm—Alexander D. Ricci; Gregory M. Hill

[57] ABSTRACT

Calcium phosphate scale control methods and compositions are disclosed. Water soluble acrylic acid/monohydroxylated alkyl allyl ether copolymers are used.

4 Claims, No Drawings

CALCIUM PHOSPHATE SCALE CONTROL METHODS

This is a divisional of application Ser. No. 07/201,645 filed June 1, 1988 now abandoned, which is a continuation of Ser. No. 06/944,160 filed Dec. 18, 1986 (not abandoned), which is a continuation in part of Ser. No. 037,484 filed Apr. 13, 1987 (now U.S. No. 4,759,851) which is a continuation of Ser. No. 864,049 filed May 16, 1986 (now U.S. No. 4,659,481) which is a continuation of Ser. No. 545,563 filed Oct. 26, 1983 (now abandoned).

FIELD OF THE INVENTION

The present invention pertains to compositions and methods adapted to control the formation and deposition of calcium phosphate in water systems such as in cooling, boiler, and gas scrubbing systems.

BACKGROUND OF THE INVENTION

The problems of scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium phosphate in the water system leads to an accumulation of this scale imparting compound along or around the metal surfaces which contact the flowing water circulating through the system. In this manner, heat transfer functions of the particular system are severely impeded.

Recently, due to the popularity of cooling system treatments requiring high levels of orthophosphate ion to promote passivation of the metallurgy in contact with the system water, it has become critically important to control calcium phosphate crystallization so that relatively high levels of orthophosphate may be maintained in the system water to achieve the desired passivation effect without resulting in fouling or impeded heat transfer functions which would normally be caused by calcium phosphate deposition.

Although boiler systems are commonly treated with sophisticated hardness removal devices such as ion exchange units and influent coagulation and filtration devices, calcium phosphate scale can also be encountered due to the residual calcium hardness left in the influent water. As is obvious, the deposition of such calcium phosphate scale on the structural parts of a steam generating system causes poor circulation and lower heat transfer capacity, resulting in overall loss in heat transfer efficiency of the system.

SUMMARY OF THE INVENTION

I have surprisingly found that addition of certain water soluble acrylic acid/monohydroxylated alkyl allyl ether copolymers to the desired water system minimizes calcium phosphate deposition that would normally form along the metallurgy in contact with the system water. Although the chief advantage of using these copolymers is to inhibit such calcium phosphate deposition, the copolymers are quite versatile in that they also function to control calcium carbonate deposition and also serve to disperse suspended particulate matter, such as clays, and iron oxides and the like, that are commonly encountered in system waters.

The water soluble copolymers useful in accordance with the invention have the formula

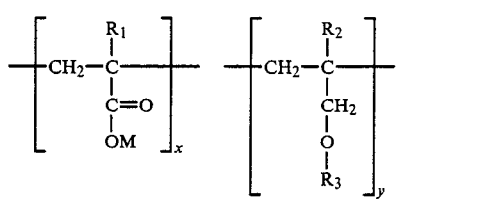

wherein $R_1$ and $R_2$ are the same or different and are H or $CH_3$, $R_3$ is a monohydroxylated alkyl group of from 1 to 6 carbon atoms, M is a cation or H. The molar ratio of x:y of the repeat units is on the order of 30:1 to 1:10.

PRIOR ART

U.S. Pat. No. 4,500,693 (Takehara, et al.) discloses sundry copolymers comprised of a (meth)acrylic acid and an allylic ether monomer. In accordance with the -693 disclosure, the allylic ether monomer may be 3-allyloxy-1,2-dihydroxypropane, or may be derived from the reaction product of 3-allyloxy-1,2-dihydroxypropane with various reagents, such as ethylene oxide, sulfuric acid, phosphorous pentoxide, propylene oxide, monoaryl sorbitan, etc. Particular attention is drawn to Example 1 of the -693 disclosure wherein an acrylic acid/3-allyloxy-1,2-dihydroxypropane copolymer is prepared. The patent further indicates that the disclosed copolymers may be used in cooling water systems as well as to provide dispersants in aqueous slurries.

Japanese Patent 56-155,692 discloses copolymers of acrylic acid and polyethylene glycol monoallyl ethers. The disclosure states that these copolymers are used for dust control applications. In the -692 Japanese patent teachings, the number of moles of ethylene oxide of the allyl ether monomer must be from 5 to 100. The disclosure states that, if the number of moles is less than 5, the scale precipitating and dispersing efficacy of the block copolymer does not suffice. In accordance with the present invention, however, the allyl ether monomer is prepared by reacting only one mole of alkylene oxide with one mole of allyl alcohol, and the resulting copolymers show superior calcium phosphate deposit control efficacy.

U.S. Pat. No. 4,029,577 (Godlewski, et al.) discloses that certain acrylic acid/hydroxyalkyl(meth)acrylate type copolymers are effective calcium phosphate scale control agents. In U.S. Pat. No. 4,303,568 (May, et al.) methods of utilizing such polymers to provide passivated films are taught.

Also of possible interest to the present invention are Chemical Abstract 99,58708X and Chemical Abstract 98,203736r. U.S. Pat. No. 4,324,684 may also be noted.

DETAILED DESCRIPTION

In accordance with the invention, it has been discovered that water soluble copolymers, as shown in Formula I hereinafter, are effective in controlling the formation of calcium phosphate deposits in water systems.

The water soluble copolymers of the invention have the structure:

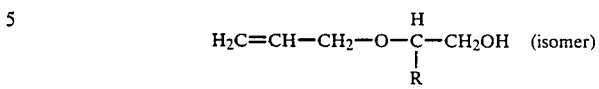

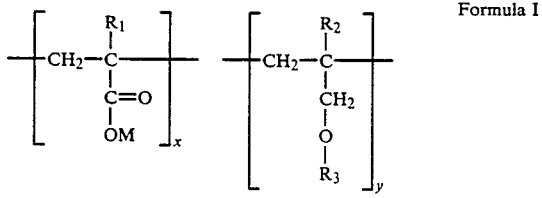

wherein $R_1$ and $R_2$ are the same or different and are H or $CH_3$, $R_3$ is a monohydroxylated alkyl group of from 1 to 6 carbon atoms, and M is a cation or H.

The number average molecular weight of the water soluble copolymers of Formula I is not critical and may fall within the range of 1,000 to 1,000,000. Preferably, the number average molecular weight will be within the range of from about 1,500 to 500,000, with the range of about 1,500 to 10,000 being even more highly desirable. The key criterion is that the polymer be water soluble.

The molar ratio x:y of the monomers of Formula I may fall within the range of between about 30:1 to 1:10, with the x:y molar ratio range of from about 15:1 to 1:5 being preferred.

At present, the water soluble polymer preferred for use in cooling water systems is:

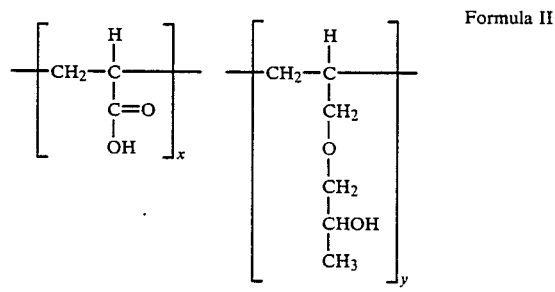

wherein x is acrylic acid and y is 1-allyloxy-2-propanol (AOP). The moiety of y is also named as 2-propanol,1-(2-propenyloxy) [21460-36-6].

This polymer (Formula II) is referred to as acrylic acid/1-allyloxy-2-propanol copolymer (AA/AOP).

As to preparation of the monomer designated as x above, in Formula I, acrylic acid is well known. It may be produced by hydrolysis of acrylonitrile or via oxidation or acrolein. Other well known vinyl containing monomers such as methacrylic acid and acrylamide may also be utilized as monomer x of Formula I in accordance with the invention.

Turning to the allyl containing monomer, monomer y, in Formula I (above), these may be produced by reacting allyl alcohol with the corresponding alkylene oxide, in the temperature range of about 25°–150° C. using KOH, NaOH or other reagents as the catalyst. During the reaction, depending on the type of catalyst and reaction conditions, isomer and polyalkoxylated product may be formed. The reaction is illustrated by the following mechanism:

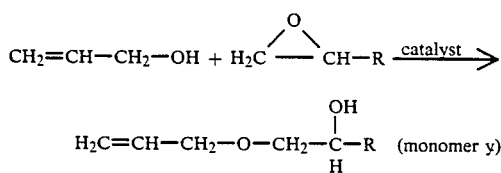

-continued $$+ \quad H_2C=CH-CH_2-O-\underset{\underset{R}{|}}{\overset{H}{\underset{|}{C}}}-CH_2OH \quad \text{(isomer)}$$

wherein R is an alkyl group ($C_1$–$C_4$). The isomer and polyalkoxylated material, along with unreacted allyl alcohol may be separated from the preferred monomer y by vacuum distillation or other physical means of separation. However, they can also be copolymerized with monomer x of Formula I. Therefore, it is also within the scope of this invention.

After the desired monomers have been obtained, free radical polymerization may proceed in accordance with conventional solution, precipitation or emulsion polymerization techniques. Polymerization initiators such as persulfate initiators, peroxide initiators, etc. may be used. Chain transfer agents such as alcohol (preferably isopropanol), amine or mercapto compounds may be used to regulate the molecular weight of polymer. The resulting polymer may be isolated by well-known methods such as precipitation, etc. If polymerized in water, the polymer may simply be used in its aqueous solution.

It should be mentioned that water soluble terpolymers comprising monomers x and y of Formulae I or II may also be prepared for use as deposit control agents and/or corrosion control agents. For instance, 1-allyloxy-2-propanol may be incorporated into a water soluble terpolymer backbone having other repeat units including acrylic acid monomers, alkyl acrylate monomers, methacrylic acid monomers, acrylamide monomers, etc. It is also to be understood that minor amounts of additional monomers may be added to the polymerization recipe.

The polymers should be added to the aqueous system for which calcium phosphate deposit control activity is desired, in an amount effective for the purpose. This amount will vary depending upon the particular system for which treatment is desired and will be influenced by factors such as the area subject to corrosion, pH, temperature, water quality and the respective concentrations in the water of the potential scale and deposit forming species. For the most part, the polymers will be effective when used at levels of about 0.1 to 500 parts per million parts of water, and preferably from about 1.0 to 100 parts per million parts of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein calcium phosphate scale control is important.

EXAMPLES

The invention will now be further described with reference to a number of specific examples which are to be regarded solely as illustrative, and not as restricting the scope of the invention.

EXAMPLE 1

Preparation of Acrylic Acid/1-allyloxy-2-propanol Copolymer

A suitable reaction flask was equipped with a mechanical agitator, a thermometer, a reflux condenser, a nitrogen inlet and two addition inlets for the initiator and monomer solutions. The flask was charged with 170 g of deionized water and 30 g of isopropanol. The resulting solution was then heated to reflux under a nitrogen blanket. 43.2 g of acrylic acid (0.6 mole) and 23.2 g of 1-allyloxy-2-propanol [AOP] (94% pure, 0.19 mole) were mixed in a separate flask so as to provide a mixed monomer solution. The mixed monomer solution was then transferred to an addition funnel. An initiator solution containing 24.4% of sodium persulfate in deionized water was prepared separately and sparged with nitrogen. The initiator solution (17 g) was then added to the reaction flask along with the mixed monomer solution over a period of two hours. After this addition, some addition persulfate solution was added to the reaction mixture for one more hour at 85° C. and, subsequently, 90.0 g of the isopropanol/water solution were stripped off. The reaction mixture was then cooled to lower than 40° C. and 36 g of 50% caustic solution was then added.

The structure of the resulting copolymer was verified by Carbon 13 NMR. The polymer solution, after being diluted to 24.8% solids with water, had a Brookfield viscosity of 15.1 cps at 25° C. It was a stable solution with a slightly yellow color. The molecular weight (Mn) was 3,500 as determined by GPC.

EXAMPLE 2

Utilizing both apparatus and procedure similar to that described in Example 1, 220 g of deionized water and 35 g of isopropanol were charged to a reaction flask. The solution was then heated to reflux temperature under a nitrogen blanket. 43.2 g of acrylic acid and 23.2 g of AOP (94%) were added to a separate flask so as to provide a mixed monomer solution. The mixed monomer solution was then added to the reaction flask along with an initiator solution comprising sodium persulfate over a two hour period. The reaction mixture was heated for two more hours and subsequently 109 g of isopropanol/water solution were stipped off. The mixture was cooled to lower than 40° C. and 34 g of 50% caustic solution was added.

The resulting polymer solution, after being diluted to 24.8% solids with water, had a Brookfield viscosity of 14.7 cps (at 25° C.). The molecular weight (Mn) was 4,000 as determined by GPC.

EXAMPLE 3

Utilizing both apparatus and procedure similar to that described in Example 1, 30 g of isopropanol and 200 g of water were added to a reaction flask. 43.2 g of acrylic acid (0.6 mole) and 12 g of AOP (94%, 0.097 mole) were added to an addition funnel so as to provide a mixed monomer solution. The mixed monomer solution was then added to the reaction flask along with a sodium persulfate containing initiator solution over a two hour period. One hour after this addition, some additional persulfate solution was added to the reaction mixture. The mixture was heated for one more hour and, subsequently, 95.4 g of isopropanol/water solution were stripped off. The mixture was cooled to lower than 40° C. and 39 g of 50% caustic was added.

The resulting polymer solution, after being diluted to 24.2% solids, had a Brookfield viscosity of 15.1 cps at 25° C. The structure of the copolymer was verified by Carbon 13 NMR.

EXAMPLE 4

Utilizing the apparatus and procedure described in Example 1, 43.2 g of acrylic acid (0.6 mole) and 12 g of AOP (94%, 0.097 mole) were used for copolymerization. The resulting polymer solution, after being diluted to 23.8% solids had a Brookfield viscosity of 15.7 cps (at 25° C.).

EXAMPLE 5

Utilizing an apparatus similar to that described in Example 1, 120 g of water and 12 g of AOP (95%, 0.097 mole) were added to a reaction flask, 51 g of methacrylic acid (0.6 mole) and sodium persulfate solution were then separately added to the reaction mixture in 2.5 hours at 90° C. The resulting polymer solution was further neutralized with 40 g of caustic (50%) and diluted to a 30% solid solution. The final solution had a Brookfield viscosity of 113 cps at 25° C.

Table I hereinbelow presents a summary of the physical properties of the copolymers produced in accordance with Examples 1 through 5.

TABLE I

Acrylic Acid/1-allyloxy-2-propanol (AA/AOP) Copolymer

| Copolymer | Mole Ratio AA/AOP | Solid (%) | Vis (cps) | pH | Mn |
|---|---|---|---|---|---|
| Example 1 | 3.2/1 | 24.8 | 15.1 | 5.7 | 3,500 |
| Example 2 | 3.2/1 | 24.8 | 14.7 | 5.6 | 4,000 |
| Example 3 | 6.2/1 | 24.2 | 15.1 | 5.5 | 4,500 |
| Example 4 | 6.2/1 | 23.8 | 15.7 | 5.6 | 4,000 |
| Example 5* | 6.2/1 | 30.0 | 11.3 | — | — |

*Methacrylic acid/AOP copolymer

Deposit Control Activity

The deposit control activity of these polymers was tested with the results being reported in Tables II to VI.

TABLE II

Calcium O-Phosphate Inhibition

Conditions: 600 ppm Ca as $CaCO_3$, 12 ppm $PO_4$, pH 7.0, 2 mM $NaHCO_3$, 70° C., 17 hours equilibration

| Example | Treatment | ppm Active | % Inhibition 5 | 10 | 20 |
|---|---|---|---|---|---|
|  | AA/HPA |  | 14 | 27 | 94 |
|  | AA/AHPSE |  | 10 | 29 | 98 |
| 1 |  |  | 15 | 45 | 95 |
| 2 |  |  | 3 | 29 | 98 |
| 3 |  |  | 22 | 29 | 95 |
| 4 |  |  | 10 | 13 | 93 |

AA/HPA = acrylic acid/2-hydroxypropylacrylate copolymer, AA:HPA 3:1 Mn ≈ 2,000
AA/AHPSE = acrylic acid/allylhydroxypropylsulfonate ether copolymer, AA:AHPSE 6:1 Mn ≈ 3,000

TABLE III $CaCO_3$ Inhibition

Conditions: 1105 ppm Ca as $CaCO_3$, 1170 ppm $CO_3$ as $CaCO_3$, pH 9.0, 70° C., 17 hour equilibration

| Example | Treatment | ppm Active | % Inhibition .5 | 1 | 2 |
|---|---|---|---|---|---|
|  | HEDP |  | 30 | 52 | 61 |
|  | AA/HPA |  | 5 | 23 | 34 |
| 1 |  |  | 0 | 20 | 36 |
| 2 |  |  | 6 | 26 | 38 |

TABLE III-continued

CaCO₃ Inhibition

Conditions: 1105 ppm Ca as CaCO₃, 1170 ppm CO₃ as CaCO₃, pH 9.0, 70° C., 17 hour equilibration

| Example | Treatment | ppm Active | % Inhibition | | |
|---|---|---|---|---|---|
| | | | .5 | 1 | 2 |
| 3 | | | | 11 | 30 | 34 |
| 4 | | | | 4 | 30 | 41 |
| | AA/AHPSE | | 0 | 20 | 33 |

HEDP = hydroxyethylidenediphosphonic acid

TABLE IV

Montmorillonite Dispersion

Conditions: 200 ppm Ca as CaCO₃, 1000 ppm montmorillonite, pH 7.0, 45° C., 10 mM NaHCO₃, 18 hours settling

| Example | Treatment | ppm Active | % Transmittance | | |
|---|---|---|---|---|---|
| | | | 5 | 10 | 20 |
| | Polyacrylic acid | | 17 | 22 | 25 |
| | AA/HPA | | 25 | 30 | 33 |
| | AA/AHPSE | | 30 | 31 | 32 |
| 1 | | | 24 | 30 | 33 |
| 2 | | | 29 | 31 | 31 |
| 3 | | | 28 | 28 | 31 |
| 4 | | | 28 | 30 | 33 |

TABLE V

Ferric Hydroxide Dispersion

Conditions: 50 ppm Fe, 200 ppm Ca as CaCO₃, pH 8.0, 45° C., 17 hours equilibration

| Example | Treatment | ppm Active | % Transmittance | | |
|---|---|---|---|---|---|
| | | | 5 | 10 | 20 |
| | Diisobutylene Maleic Anhydride Copolymer | | 3 | 17 | 44 |
| | AA/HPA | | 5 | 15 | 33 |
| | AA/AHPSE | | 2 | 7 | 28 |
| 1 | | | 2 | 7 | 21 |
| 2 | | | 2 | 6 | 15 |
| 3 | | | 3 | 4 | 9 |
| 4 | | | 2 | 3 | 7 |

The procedures used for the above tests are detailed in U.S. Pat. No. 4,452,704 (Snyder et al.). It is noted that in Tables IV and V, increasing Δ% Transmittance values indicate better treatment as more particles remain suspended in the aqueous medium.

Boiler Studies

In order to assess the efficacy of the polymers of the present invention in inhibiting scale formation in steam generating systems, research boilers were fitted with two 4,000 watt electrical heater probes, giving 185,000 BTU/ft²/hr and about 8 Kg/hr steam.

Results for the boiler experiments with a phosphate precipitation program at 900 psig are listed below. The feedwater contained 4 ppm of calcium and 1 ppm of magnesium (both as CaCO₃) and the boiler operated at approximately 15 cycles.

TABLE VI

Boiler Testing

| Treatment | Dosage (ppm Active) | Deposit Weight Density (g/ft²) |
|---|---|---|
| Control | 0 | 8.10 |
| Example 5 | 2.5 | 0.25 |
| Example 5 | 5.0 | 0.24 |
| Example 5 | 10.0 | 0.24 |

The examples demonstrate that the copolymers of the present invention are effective in inhibiting the formation of those deposits normally encountered in industrial water systems such as cooling and boiler systems. Indeed, in the boiler studies, the results were roughly equivalent to old test results using the well-known copolymer polysulfonated styrene/maleic anhydride. Further, the copolymers of the present invention are effective in dispersing clay and oxide, which are sometimes encountered as a troublesome fouling species.

Comparative Tests

In order to compare the performance of the acrylic acid/monohydroxylated alkyl allyl ether copolymers of the present invention with a prior art copolymer disclosed in U.S. Pat. No. 4,500,693 (Takehara et al.), the procedure reported in Example 1 of the Takehara et al. patent was repeated so as to yield a copolymer of acrylic acid/3-allyloxy-1,2-dihydroxypropane as therein reported. Calcium phosphate inhibition tests were performed to contrast the efficacy of the Takehara et al. Example 1 copolymer with polymers as herein disclosed. Results of the comparative test are reported in Table VII.

TABLE VII

Calcium O-Phosphate Inhibition

Conditions: 600 ppm Ca as CaCO₃, 12 ppm PO₄, pH 7.0, 2 mM NaHCO₃, 70° C., 17 hours equilibration

| Treatment | ppm Active | % Inhibition | | |
|---|---|---|---|---|
| | | 5 | 10 | 20 |
| Ex. 1, U.S. Pat. No. 4,500,693 | | 1 | 6 | 24 |
| Example 3 | | 13 | 18 | 96 |
| Example 1 | | 19 | 45 | 100 |
| AA/HPA | | 15 | 25 | 91 |

Passivation

The copolymers of the present invention may also be used in accordance with the methods disclosed in U.S. Pat. No. 4,303,568 (May et al.) in order to passivate the desired metal surfaces. As is stated in that patent, the passive oxide film is provided on metal surfaces in contact with the aqueous medium without substantial attendant deposition formed thereon. A composition containing polymer and orthophosphate and optionally but preferably a phosphonate, polyphosphate and copper corrosion inhibitors is used in order to achieve such passivation. A typical composition contains on a weight ratio basis of polymer to orthophosphate expressed as PO₄⁻⁻⁻ of about 1:8 to about 4:1 and preferably about 1:6 to 2:1. When a polyphosphate* is included, the weight ratio of orthophosphate to polyphosphate on a PO₄⁻⁻⁻ to PO₄⁻⁻⁻ basis is 15:1 to 1:3, and preferably 2.5:1 to 1:1. Similarly, if the organo-phosphonate is included, the ratio of the orthophosphate to the phosphonate expressed as PO₄⁻⁻⁻ to PO₄⁻⁻⁻ is 1:2 to 13:1, and preferably 2:1 to 8:1. Any copper corrosion inhibitor may be included in the composition (0.01 to 5% by weight) in an amount which will be effective for controlling the copper corrosion in a given system: 0.05 to 10 parts per million and preferably 0.5 to 5 parts per million. Similarly, zinc salts may be included if additional protection is needed.

*Betz Handbook of Industrial Water Conditioning, 6th edition, 1962, pages 394–396, Betz Laboratories, Inc., Trevose, PA.

In treating the aqueous systems to provide such passivation, the following dosages in parts per million parts of water in said aqueous systems of the respective ingredients are desirable, with the dosages, of course, being based upon the severity of the corrosion problem foreseen or experienced:

orthophosphate (expressed as $PO_4^{---}$): 2 to 50 parts per million parts of water (ppm) and preferably 6 to 30 ppm;

polymer: 0.3 to 120 ppm and preferably 3 to 25 ppm per million parts of water;

polyphosphate (expressed at $PO_4^{---}$): 0.1 to 30, and preferably 3 to 10, parts per million parts of water;

phosphonate (expressed as $PO_4^{---}$): 0.04 to 20, and preferably 1 to 6, parts per million parts of water.

The preferred rate of application of this treatment to cooling water systems and the ratios of various components depends on the calcium concentration of the cooling water. The treatment is preferably applied in waters having between 15 ppm and 1,000 ppm calcium. Within this range the weight ratio of calcium to orthophosphate is varied from 1:1 to 83.3:1, the weight ratio of polymer to orthophosphate is varied from 1:3 to 1.5:1.

The orthophosphate which is critical to the passivation aspect of the present invention is generally obtained by direct addition. However, it is understood that the orthophosphate can also arise due to reversion of either inorganic polyphosphates or the organo-phosphonates, or any other appropriate source or precursor thereof.

The above dosages represent the most desirable ranges since most systems will be treatable therewith. Higher dosages are permissible when the situation demands, but of course are more costly. The effectiveness of the inventive treatments are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. Method of inhibiting calcium phosphate deposition on the metallic parts in contact with an aqueous medium, comprising adding to said system from 0.1 to 500 parts per million, based on one million parts of said aqueous medium, of an effective water soluble, polymeric calcium phosphate scale control agent, wherein the repeat units of said water soluble calcium phosphate scale control agent have the structure

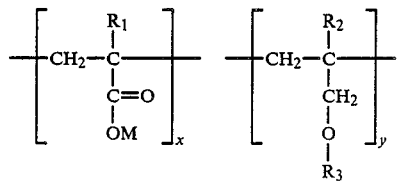

wherein $R_1$ and $R_2$ are H, $R_3$ is 2-hydroxypropyl, M is a cation or H, wherein the number average molecular weight of said polymeric calcium phosphate scale control agent is within the range of 1,500 to 10,000 and wherein the molar ratio x:y of said repeat units is within the range of about 6.2:1 to 3.2:1.

2. Method as recited in claim 1 wherein said aqueous medium is contained within a cooling water system.

3. Method as recited in claim 1 wherein said aqueous medium is contained within a boiler water system.

4. Method as recited in claim 1 wherein said aqueous medium is contained within a gas scrubbing system.

* * * * *